United States Patent [19]
Olney et al.

[11] 4,178,660
[45] Dec. 18, 1979

[54] METHOD AND APPARATUS FOR INTRODUCING AND DISTRIBUTING FOOD ADDITIVES IN MEATS

[76] Inventors: Alvin A. Olney; Rachel I. Olney, both of P.O. Box 1642, Newport Beach, Calif. 92663

[21] Appl. No.: 890,040
[22] Filed: Mar. 27, 1978
[51] Int. Cl.² .................................................. A22C 17/00
[52] U.S. Cl. .................................... 17/42.1; 99/450.8; 99/532; 99/494
[58] Field of Search ............... 17/42.1; 99/450.7, 450.8, 99/532, 533, 494

[56] References Cited
U.S. PATENT DOCUMENTS

| | | | |
|---|---|---|---|
| 867,044 | 9/1907 | Huss | 17/42.1 |
| 1,485,253 | 2/1924 | Devlin | 99/532 X |
| 2,124,700 | 7/1938 | Hartzell | 17/42.1 |
| 3,161,154 | 12/1964 | Schott | 99/450.8 |

FOREIGN PATENT DOCUMENTS

| | | | |
|---|---|---|---|
| 54456 | 11/1890 | Fed. Rep. of Germany | 17/42.1 |
| 97834 | 6/1897 | Fed. Rep. of Germany | 17/42.1 |

*Primary Examiner*—Willie G. Abercrombie
*Attorney, Agent, or Firm*—Elgin C. Edwards

[57] ABSTRACT

A method and apparatus for introducing and distributing meat additives into bodies of meat are described. The apparatus includes a cylindrical container having a detachable pointed tip for piercing the body of meat and may also include a plunger to fit inside the container to force the additives to deposit along a uniform path in the meat when the cylindrical container is withdrawn.

3 Claims, 6 Drawing Figures

U.S. Patent  Dec. 18, 1979  Sheet 1 of 2  4,178,660
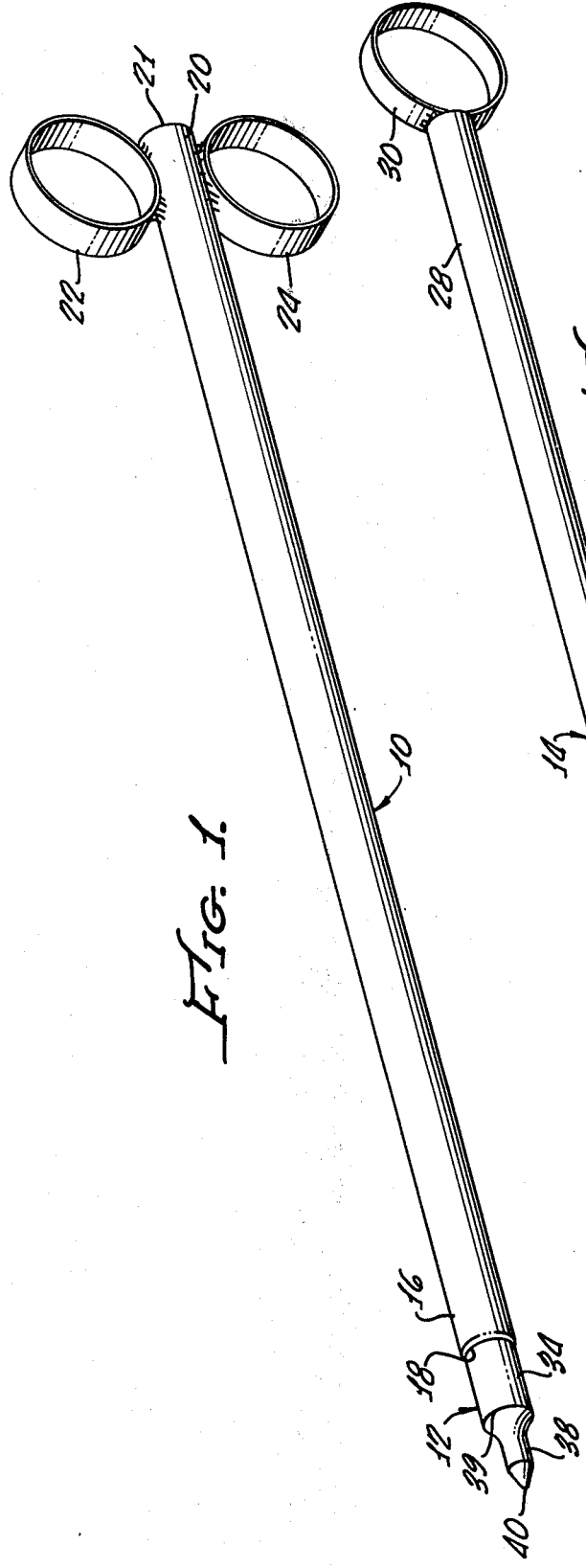
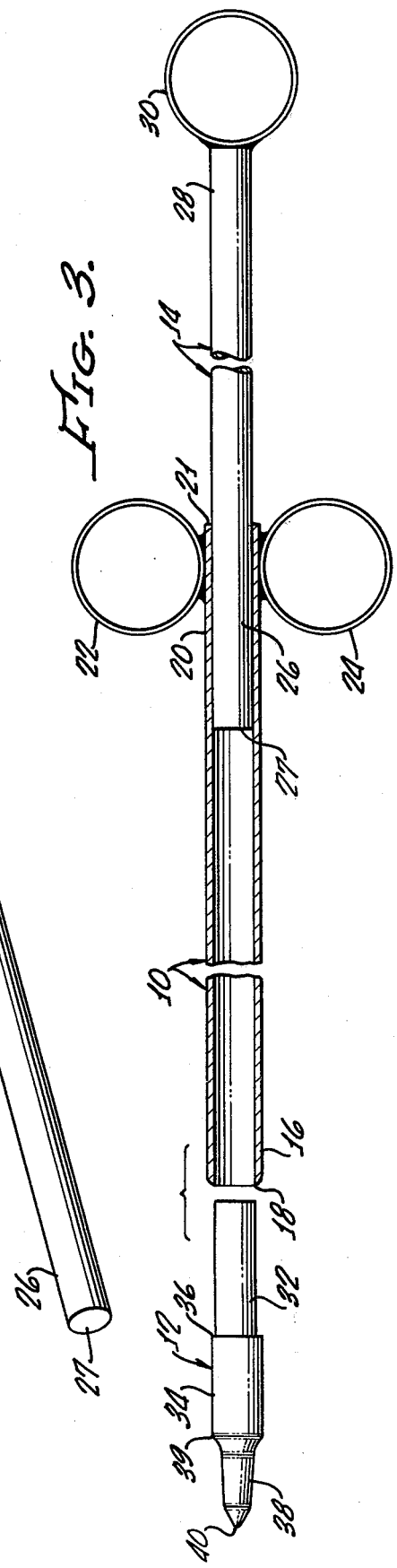

METHOD AND APPARATUS FOR INTRODUCING AND DISTRIBUTING FOOD ADDITIVES IN MEATS

BACKGROUND OF THE INVENTION

It has long been considered desirable to improve the taste, appearance and cooking characteristics of meats by introducing additives into the meats, usually before cooking them. For example, solid additives such as pieces of garlic, strips of meat fat, salt pork, pepper or other spices, and the like, may be desirably added to meats such as beef roasts or hams, and the like, prior to cooking them. Semi-solids or liquids such as lard, butter, margarine, oils, cheeses, liquid flavorings, and dyes may also be added to meat or meat dishes (such as meatloafs or pressed or pre-formed ground meats and mixtures of meats and other foods).

Many techniques and devices for introducing additives to meats have been contemplated in the prior art but all have disadvantages. The disadvantages encountered in the prior art are especially severe in connection with the use of conventional devices in restaurants or other food-preparing facilities where the ease and speed of using the apparatus, as well as the appearance and uniformity of the cooked product are desirable. It is also particularly important in such facilities that the devices used be easy to clean, or disposable, to meet sanitation and hygiene requirements.

One common device of the prior art is the larding spike, which typically consists of a grooved tube having a sharp end for inserting it into a body of meat. An example of a larding spike, or a variation thereof, is shown in U.S. Pat. No. 2,473,191. In such a device, a solid or semi-solid food additive such as lard is pressed into the grooved tube of the spike. The spike is then inserted into the body of meat which is to be treated. Ideally, the grooved tube is completely inserted without scraping off any of the lard during the insertion. The grooved tube is then withdrawn from the meat, and an attempt is made to scrape off the lard during withdrawal such that it is uniformly distributed throughout the path cut by the tube through the meat.

Obviously, such devices as larding spikes cannot be used with a liquid additive. Also, it is extremely difficult to distribute any additive uniformly using a larding spike because there is a great tendency for much or all of the additive to scrape off the spike at the entrance into the body of meat or at some especially dense or tough zone inside the meat. Alternatively, when the spike is designed to prevent the additive from being easily scraped off, the additive may adhere to the groove in the spike so tenaciously as to not be completely stripped and removed from it even when the spike is withdrawn from the meat. In any event, a chef or other food preparer using such a device can never be sure how well the additive is distributed until after the meat is cooked and cut open.

Other devices known to the prior art have been constructed essentially like hypodermic needles. These devices also have numerous disadvantages. If the hole or opening in the needle is too large, it cannot be used with liquids without excessive dripping and loss of liquid before it can be uniformly injected and distributed within the body of meat. On the other hand, if the hypodermic needle has a hole, or multiple holes, which are too small, it cannot be used with solids, semisolids or viscous liquids. Moreover, in inserting needles into meat, it is often found that the openings are clogged by torn pieces of meat so that it is very difficult or impossible to inject the contents of the hypodermic syringe. Even when injection is possible, it is extremely difficult to do so uniformly.

Even if the opening or openings of a hypodermic type of injection device do not become plugged or partially filled with meat, the use of the hypodermic technique requires considerable practice and expertise to achieve a uniform distribution of additive. Typically, the hypodermic needle-type of apparatus is used by inserting the needle, injecting a small amount of additive, withdrawing the needle partially out of the meat, injecting an additional amount of additive, further withdrawing the needle, and making further injections until all of the additive is used or the needle is withdrawn completely from the meat. This technique has a tendency to produce pockets in the meat which are rich in additives; however, between the pockets, there are zones which have no additive at all.

When a hypodermic device having a large needle with openings sufficiently large to use with solid, semi-solid or viscous liquid additives, such as margarine, are used, the openings in the hypodermic tend to fill with meat. Equally bad, they may bend and tear the tissue or even cut out a plug of meat as the needle is inserted. As this occurs, the torn meat may displace part of the margarine, or other additive, depositing it in a lump in the body of meat, again causing a very nonuniform distribution of additive. Moreover, even if the chef can somehow inject the additive uniformly, the melting of the additive as the meat is cooked permits it to settle to the bottom of any holes or pockets produced by the tearing or severing of the meat tissues.

Other techniques for introducing and distributing additives in meat have been tried. These range from simply scoring the surface to cutting into the meat and manually depositing the additive, either using knives or highly complex injection devices. All of these techniques suffer from one or more deficiencies. Moreover, many techniques create sanitation and hygiene problems because the apparatus used is extremely difficult to clean. This is a particularly severe problem when devices having intricate configurations are used, since these may create traps for small quantities of meat or additives in small passageways or openings.

It is an object of the present invention to provide a method and apparatus for introducing and distributing additives in bodies of meat while lessening or eliminating the foregoing and other problems of the prior art.

SUMMARY OF THE INVENTION

In accordance with the present invention, a rigid hollow cylinder or tube is at least partially filled with a quantity of meat additive and sealed at one end with a detachable pointed seal. The tube is then forced into and through the body of meat, pointed end first. Thus, the tube serves as both the sole container and storage means for the additive and also as a distributing means which is introduced into the body of meat. When the pointed seal protrudes from the opposite side of the body of meat, the seal is removed. The detachable seal can be removed while the associated end of the tube is still slightly within the body of meat to prevent additive from leaking out. Alternatively, the tube can be forced all the way through until the entire pointed seal and part of the tube itself protrude from the body of meat, then the seal can be removed and the resulting open end of the tube can be withdrawn back into the body of meat before any significant leakage occurs.

When free flowing additives, especially liquids, are used, no additional apparatus is required. The tube is withdrawn from the meat and the free flowing additive will remain inside, distributed uniformly along the withdrawal path of the tube.

When additives are to be used which are not free flowing, such as when lard, suet, cheese, or strips of fat, or the like, are used, an additional piece of apparatus is required. The additional apparatus includes a piston or plunger means adapted to fit within the tube and prevent the additive from being withdrawn from the meat along with the tube. In a particularly preferred embodiment, the piston means consists of a solid cylindrical rod which is sized to fit within the cylindrical tube, substantially filling the cross section of the tube so that little or no additive can leak past it. The rod is inserted just within the exposed end of the tube after the main portion of the tube is inserted into the body of meat. The piston, however, is not forced into the tube such as to extrude any of the contents out of the other end of the tube prematurely. Rather, the piston rod is held in a substantially steady position with essentially no axial movement, and the tube is then withdrawn from the body of meat, moving axially and concentrically about the rod. As the tube is withdrawn, the stationary rod prevents the additive within the tube from being withdrawn from the meat, and, accordingly, the additive is deposited and distributed uniformly along the withdrawal path of the tube.

BRIEF DESCRIPTION OF THE DRAWINGS

FIG. 1 is a perspective view of the meat additive cylinder and detachable pointed seal;

FIG. 2 is a perspective view of a piston or plunger suitable for use with the cylinder shown in FIG. 1;

FIG. 3 shows in exploded partial cross section the details of the detachable pointed seal and the functional relationship between the plunger and cylinder;

DETAILED DESCRIPTION

Figure 4:
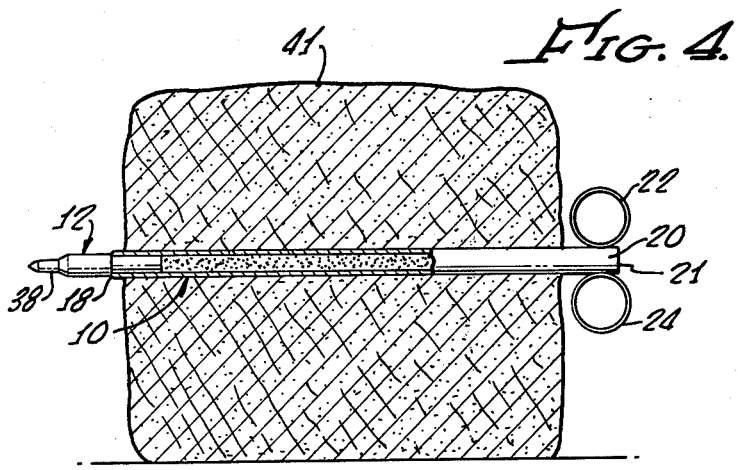
FIG. 4 is a partial cross-sectional view of the meat additive cylinder, with the detachable seal in place, extending entirely through a body of meat at the beginning of an additive distribution process.

As shown in FIGS. 1, 2 and 3, the apparatus of the present invention may include a hollow cylinder or tube 10, a detachable pointed seal 12 for tube 10, and a plunger or piston 14 having a length sufficient to extend through substantially the full length of tube 10. The piston 14 has a diameter sufficient to substantially seal the tube 10 when the piston is inserted therein.

The tube 10 has a distributing end portion 16 terminating preferably at a sharpened beveled tip 18 which provides a smooth union with detachable pointed seal 12. The outer end portion 20 of the tube 10 is equipped with finger rings 22 and 24 to permit easy and precise manipulation, insertion, and withdrawal of the tube as hereinafter described.

Piston or plunger 14 has an inner end portion 26 terminating in a blunt tip 27, and an outer end portion 28, the latter being attached to a finger ring 30 similar to rings 22 and 24 on cylindrical tube 10.

Detachable pointed seal 12 comprises a cylindrical sealing end portion or plug 32, which is adapted to fit snugly within end portion 16 of tube 10 when the apparatus is in use. Detachable pointed seal 12 also includes a mid-portion 34 connected to sealing portion 32 at shoulder 36. The midportion 34 has a diameter larger than the internal diameter of tube 10, thus preventing pointed seal 12 from slipping entirely inside tube 10. When the detachable pointed seal 12 in is position as shown in FIG. 1, the shoulder 36 rests against the beveled tip 18 of tube 10 and provides a relatively smooth transition between tube 10 and detachable seal 12.

Detachable pointed seal 12 is also provided with a tapered portion 38 terminating in a sharp tip 40 at the end opposite that of sealing portion 32. The tapered portion 38 should preferably provide a smooth surface and gradual taper from mid-portion 34 to tip 40, which will permit insertion of the detachable pointed seal 12 and tube 10 into a body of meat without significantly or detrimentally tearing or rending the tissue thereof. Generally, the taper should be sufficiently gradual that the length of tapered portion 38, relative to tube 10, is at least 1.0 tube diameters. In other words, the distance from the tip 40 to intersecton 39 of tapered portion 38 and mid-portion 34 should be at least equal to the outside diameter of tube 10. Preferably, the taper is even more gradual, such that tapered portion 38 is from approximately 1.5 to 3.5 tube diameters. Even more gradual tapers may be appropriate for some uses; however, an excessively slender tip can cause problems if it is too unwieldy in length to maneuver it, e.g., to avoid a bone. Moreover, it may be structurally too weak to penetrate some meats without bending. The use of such a tapered point will permit the meat to return substantially to its original internal structure after the cylindrical tube 10 has been withdrawn from the meat, such that no large hole, passageways, or hollow pockets will remain.

Mid-portion 34 can be of any convenient length. Its diameter at shoulder 36, however, should be substantially the same or slightly smaller than the outside diameter of tube 10 to ensure a smooth transition between the two parts. This is desirable to avoid snagging or tearing meat tissue at beveled tip 18 when the tube 10 is being forced through a body of meat.

Figure 5:
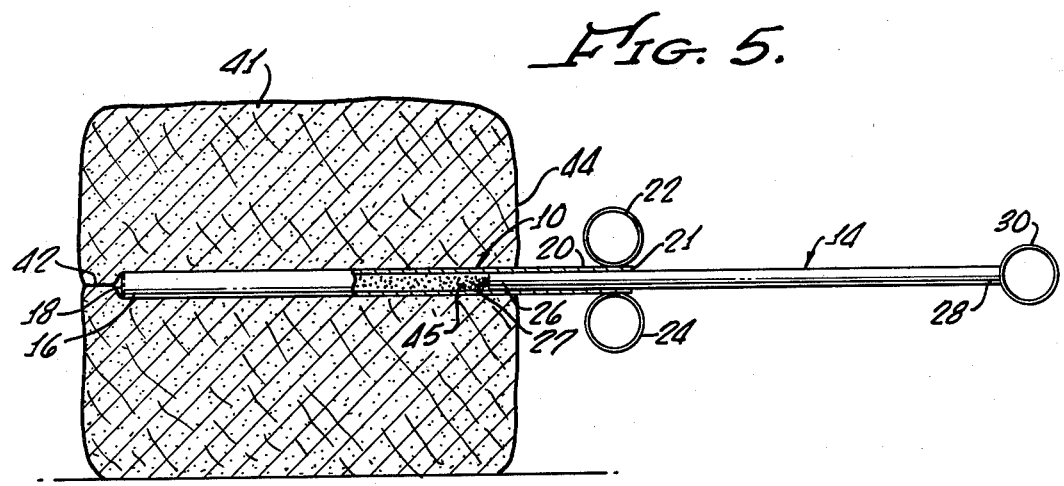
FIG. 5 shows the distribution process, as commenced in FIG. 4, after the detachable seal has been removed from the cylinder and the cylinder has been withdrawn slightly back into the body of meat.
Figure 6:
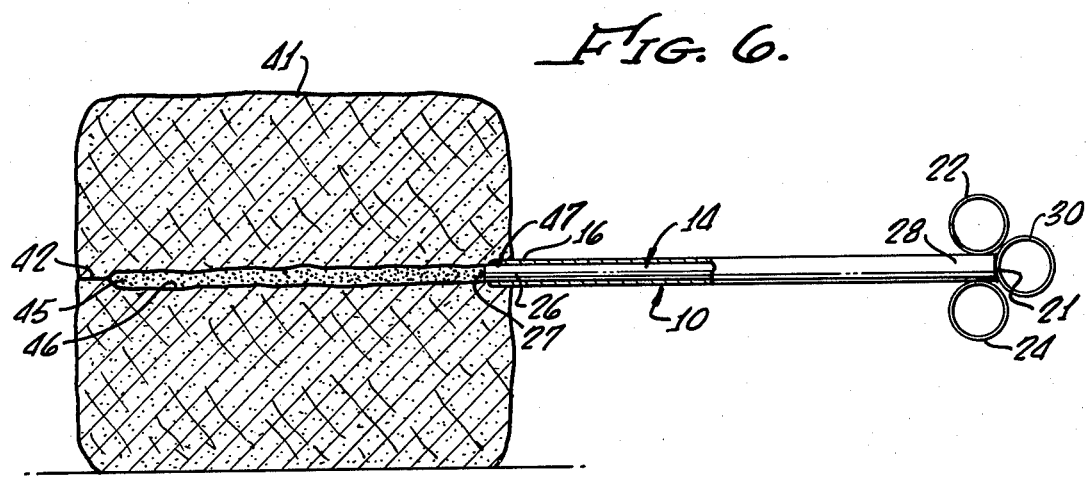
FIG. 6 shows the final stage of the additive distribution process with the additive cylinder substantially withdrawn from the body of meat.

The operation of the apparatus of this invention and the method of introducing and distributing food additives into a body of meat will be better understood by reference to FIGS. 4, 5 and 6.

The first step in the method for introducing additives into a body of meat is to fill tube 10 at least partially with the desired additive or additives. This may be accomplished in various ways. For example, when lard, suet, cheese or other semi-solid or liquid additive is used, tube 10 can simply be forced, the sharpened beveled tip 18 of end portion 16 first, into a container of additive, submerging the tube a sufficient distance to fill it to the desired level. A relatively blunt tip 18 will be satisfactory for submerging the tube in liquids; however, with additives which are difficult to penetrate, such as suet or cheese, it is desirable to use a much sharper beveled tip.

It is critical that the inside diameter of tube 10 be sufficiently large to permit entry of viscous semi-solids or solids such as suet, cheese, or the like, when the tube is forced into a container of such additive. For such an additive, the inside diameter should be at least about 3/16". For very short tubes, it may be possible to use tubes of slightly smaller inside diameters; however, with long tubes, the end opening will plug up before the tube is sufficiently full if smaller diameters are used. Outstanding results have been achieved with a tube 10 one foot long having a uniform internal diameter of approximately 5/16".

It is also important that tube 10 not be too large in inside diameter, preferably less than about 7/16", since larger tubes make it extremely difficult, or impossible, to introduce additives in meat in proper quantities with suitable distributions to achieve the desired effects of the additives. Moreover, larger tubes necessarily have larger external diameters which tend to rupture the meat tissues and weaken or destroy its resiliency, which results in leakage or non-uniform distribution of additives. Preferably, the tube should be filled along its length a distance approximately the same as the diameter of the body of meat which is to be treated (slightly less than liquids).

After the tube is at least partially filled, detachable pointed seal 12 is inserted snugly into position to seal the end portion 16. In the embodiment of the invention shown in the drawings, the sealing end portion or plug 32 of detachable seal 12 is machined to a diameter just sufficient to provide a snug fit within tube 10. However, a positive lock is also contemplated by providing a detent in tube 10 and a corresponding circumferential locking groove in end portion 32, or by providing a twist lock connection between the tube and the seal, or by simply splitting end portion 32 and slightly expanding and separating the resulting prongs of the end portion to provide a resilient spring force to grip and engage the inner walls of end portion 16 of tube 10 snugly.

An alternative method for filling tube 10 with additives, especially liquids, is simply to attach the detachable seal 12 to the tube and then fill the tube with the desired meat additives from the opening 21 of outer end portion 20 until the tube 10 is filled to the desired level.

If a marbled effect in the body of meat, using different additives, is desired, then different ingredients can be alternately added to tube 10. For example, it may be desirable to alternate margarine, cheese, garlic, and the like, rather than mixing them into a homogeneous blend.

After the tube 10 has been filled to the desired level and detachable pointed seal 12 is securely in place, the tube-and-seal combination is inserted, tip 40 first, into and through a body of meat 41 as shown in FIG. 4. The tube and pointed seal can slide easily through the body of meat, since there are no openings or abrupt protruding surfaces to engage the meat tissues, or otherwise resist penetration. The tube can be forced entirely through the body of meat as shown in FIG. 4, or, alternatively, the penetration can stop just after the tapered portion 38 of the detachable pointed seal 12 protrudes from the body of meat 41. By using the latter technique, the beveled tip 18 of tube 10 will remain entirely inside the body of meat so that when detachable seal 12 is removed, the meat can quickly close over the end of the tube and prevent leakage of any of the additive out of the body of meat 41.

It is also possible for the user of the apparatus to cover and seal the opening 21 of outer end portion 20 of tube 10, for example, by putting a thumb over it, and this will prevent any liquid from draining out of the other end of the tube when the detachable seal 12 is removed. The thumb can be removed from the opening 21 after beveled tip 18 of tube 10 is withdrawn and encompassed completely within the body of meat 41 as shown in FIG. 5. It is vital that excessive tearing of the meat tissue be avoided to preserve sufficient resiliency in the zone of closure 42 in order to seal the meat about the beveled tip 18 and prevent leakage. This can be achieved by using the smooth, tapered seal 12 as described above.

When a freely flowing liquid additive is being used, it is possible to obtain a uniform distribution of additive in the body of meat simply by withdrawing the tube 10 and allowing the liquid to flow out or be drawn out by the ensuing vacuum along the withdrawal path of the tube 10. It is again important in this regard that no substantial tearing or permanent dislocation of meat tissue along the path occur, if irregular pockets of additives are to be avoided, and if a snug seal between the meat and the tube is to be achieved to produce the desired vacuum.

When solid or highly viscous additives are being used, the initial steps of filling tube 10 and inserting it into the body of meat 40 will be identical to the procedure described above. However, it will not ordinarily be possible to distribute the additive along the path of withdrawal of the tube simply by removing the tube from the meat, i.e., the vacuum created will be insufficient to draw the additive from the tube. Accordingly, it is necessary to use piston or plunger 14 as shown in FIGS. 5 and 6. The precise operation of the apparatus is very important if uniform distribution of the additive is to be achieved.

In accordance with the preferred embodiment of the invention, the plunger 14 is inserted into outer end portion 20 of tube 10 as shown in FIG. 5, until blunt tip 27 of the plunger is at a point approximately even with the outer edge 44 of the body of meat 41. Preferably, the tip 27 of the plunger 14 will just abut the additive contents 45 of tube 10 without exerting sufficient pressure against the contents to cause any substantial amount of additive to be forced out of the tube and into the meat.

After the plunger 14 is inserted as described above into the outer end portion 20 of tube 10, the plunger is held securely without significant axial movement. Finger ring 30 may be advantageously employed for this purpose by inserting a thumb or forefinger through it. Tube 10 is then withdrawn as, for example, by using the finger rings 22 and 24 to move tube 10 axially outwardly from the body of meat 41. As tube 10 moves axially outwardly and concentrically about plunger 14, the contents 45 of the tube, i.e., the meat additives, are distributed in a uniform strip along the withdrawal path 46 inside body of meat 41, as seen in FIG. 6. When the tube is fully withdrawn from the meat, the outer surface of the meat 41 adjacent the opening 47, where the tube was inserted, can close about the opening, and, if no substantial tearing of the meat tissue has occurred, the meat will essentially seal the opening 47 and no substantial leakage of additive will occur.

By repeating the above process, the entire body of meat 41 can be marbled and treated throughout with the same or different additives to provide a uniform, attractive product of consistent quality.

By using the apparatus of the present invention, the hygiene problems associated with many prior art devices are also eliminated. Thus, for example, the washing or cleaning of the present device is very simple and can be achieved, for example, by merely using the plunger 14 itself to move or pump water or detergent throught the tube 10 to clean it. Also, the plunger 14 and the detachable pointed seal 12 can both be easily cleaned, since neither has any intricate surfaces or crevices which can retain deposits of meat or additive products.

Any durable materials, suitable for use with foods, having sufficient stiffness, strength, and construction characteristics may be used to make the apparatus of the invention. Stainless steel has been found to have excellent characteristics; however, it is also contemplated to use aluminum, plastics, and the like.

While the invention has been described with particularity in accordance with certain preferred embodiments, it will be apparent to those skilled in the art that many variations are possible within the spirit of the invention, and accordingly, it is intended that the scope of the invention be limited only by the attached claims.

We claim:

1. Apparatus for introducing and distributing additives into a body of meat consisting of, in combination:
    (a) a rigid unitary cylindrical tube having an inside diameter between about 3/16 inch and about 7/16 inch, said tube having a circular opening at each end and having a length sufficient to extend entirely through said body of meat and having an interior cavity adapted to contain a supply of additives, said tube having a distributing end portion and an outer end portion;
    (b) an elongated sealing member adapted for detachable connection to the distributing end portion of said tube, said sealing member consisting of:
        (i) a sealing end portion adapted to fit within and seal the circular opening of the distributing end portion of said tube and prevent leakage of additives therefrom, said sealing end portion being a solid cylinder whose diameter is just sufficiently smaller than the internal diameter of said cylindrical tube to fit snugly therein,
        (ii) a mid portion consisting of a solid cylinder having a diameter intermediate the internal and external diameters of said cylindrical tube, said mid portion being integrally connected with said sealing end portion and in axial alignment therewith, said mid portion terminating at the interconnection with said sealing end portion to form a radially extending shoulder perpendicular to the axis of said mid portion, and
        (iii) a pointed end portion having a sharpened tip adapted to be forced through and to penetrate said body of meat without excessive destruction of tissue thereof, said pointed end portion consisting of a tapered solid section ranging in length between about 1.5 and about 3.5 diameters of said cylindrical tube, said tapered section being integrally connected in axial alignment with said mid portion, said tapered section tapering smoothly down from the diameter of said mid portion symmetrically about a straight linear axis to a pointed tip; and
    (c) an elongated piston means adapted to fit within the cylindrical opening of the outer end portion of said tube and to substantially seal said outer end portion against leakage of additives therefrom and to displace additives from said interior cavity of said tube through said distributing end portion when said tube is moved axially and concentrically about said piston means.

2. Apparatus as recited in claim 1 wherein said distributing end portion of said tube includes a beveled tip.

3. Apparatus for introducing and distributing additives into a body of meat consisting of, in combination:
    (a) a rigid unitary cylindrical tube having an inside diameter between about 3/16 inch and about 7/16 inch, said tube having a circular opening at each end and having a length sufficient to extend entirely through said body of meat and having an interior cavity adapted to contain a supply of additives, said tube having a distributing end portion and an outer end portion;
    (b) an elongated sealing member adapted for detachable connection to the distributing end portion of said tube, said sealing member consisting of:
        (i) a sealing end portion adapted to fit within and seal the circular opening of the distributing end portion of said tube and prevent leakage of additives therefrom, said sealing end portion being a solid cylinder whose diameter is just sufficiently smaller than the internal diameter of said cylindrical tube to fit snugly therein,
        (ii) a mid portion consisting of a solid cylinder having a diameter intermediate the internal and external diameters of said cylindrical tube, said mid portion being integrally connected with said sealing end portion and in axial alignment therewith, said mid portion terminating at the interconnection with said sealing end portion to form a radially extending shoulder perpendicular to the axis of said mid portion, and
        (iii) a pointed end portion having a sharpened tip adapted to be forced through and to penetrate said body of meat without excessive destruction of tissue thereof, said pointed end portion consisting of a tapered solid section ranging in length between about 1.5 and about 3.5 diameters of said cylindrical tube, said tapered section being integrally connected in axial alignment with said mid portion, said tapered section tapering smoothly down from the diameter of said mid portion symmetrically about a straight linear axis to a pointed tip;
    (c) an elongated piston means adapted to fit within the cylindrical opening of the outer end portion of said tube and to substantially seal said outer end portion against leakage of additives therefrom and to displace additives from said interior cavity of said tube through said distributing end portion when said tube is moved axially and concentrically about said piston means,
    (d) a pair of finger rings attached to the outer end portion of said cylindrical tube on opposite sides thereof, the axes of said rings being substantially parallel to each other and substantially perpendicular to the axis of said tube; and
    (e) a finger ring attached to an end of said piston means, the axis of said finger ring being substantially perpendicular to the axis of said piston means.

* * * * *